United States Patent
Morrow et al.

(10) Patent No.: US 8,413,718 B2
(45) Date of Patent: Apr. 9, 2013

(54) OIL RECOVERY BY SEQUENTIAL WATERFLOODING WITH OIL REINJECTION AND OIL RELOCATION

(75) Inventors: Norman R. Morrow, Laramie, WY (US); Sheena Xina Xie, Laramie, WY (US); Nina Loahardjo, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 12/936,870

(22) PCT Filed: Apr. 7, 2009

(86) PCT No.: PCT/US2009/039825
§ 371 (c)(1),
(2), (4) Date: Oct. 7, 2010

(87) PCT Pub. No.: WO2009/126663
PCT Pub. Date: Oct. 15, 2009

(65) Prior Publication Data
US 2011/0036580 A1 Feb. 17, 2011

Related U.S. Application Data

(60) Provisional application No. 61/043,068, filed on Apr. 7, 2008.

(51) Int. Cl.
*E21B 43/20* (2006.01)
*E21B 43/22* (2006.01)

(52) U.S. Cl.
USPC ............... 166/270.2; 166/270.1; 166/275; 166/400

(58) Field of Classification Search .............. 166/266, 166/268, 270.1, 270.2, 275, 305.1, 400; 507/935
See application file for complete search history.

(56) References Cited

U.S. PATENT DOCUMENTS

| | | | | |
|---|---|---|---|---|
| 3,053,765 A | * | 9/1962 | Sparks | 166/400 |
| 3,075,918 A | * | 1/1963 | Holm | 507/277 |
| 3,240,272 A | * | 3/1966 | Orkiszewski | 166/400 |

(Continued)

OTHER PUBLICATIONS

International Search Report for PCT/US09/39825, International Searching Authority, May 28, 2009, pp. 1-8.

(Continued)

*Primary Examiner* — George Suchfield
(74) *Attorney, Agent, or Firm* — Samuel M. Freund; Cochran Freund & Young LLC (57) ABSTRACT

A method for enhancing oil recovery from reservoirs is described. The method includes partially recharging zones of pore space in a reservoir that has been previously waterflooded to extract oil, in order to obtain increased ultimate oil recovery by re-waterflooding the recharged zones. The recharging may be achieved by either reinjection of oil or by change in injection scheme, such as changing an oil producing well to a water injection well. This procedure of recharging with oil followed by waterflooding may be repeated. Application of the present method to increase recovery from reservoirs producing dry (water-free) oil to mature reservoirs which produce at high water-to-oil ratios is anticipated.

13 Claims, 11 Drawing Sheets

U.S. PATENT DOCUMENTS

| | | | | |
|---|---|---|---|---|
| 3,254,712 A | * | 6/1966 | Sharp | 166/266 |
| 3,258,071 A | * | 6/1966 | Yu Shen et al. | 166/275 |
| 3,303,878 A | * | 2/1967 | Connally, Jr | 166/400 |
| 3,818,989 A | * | 6/1974 | Christopher et al. | 166/270.1 |
| 3,957,116 A | * | 5/1976 | Bouck | 166/245 |
| 4,008,766 A | * | 2/1977 | Savins | 166/270.1 |
| 4,066,126 A | * | 1/1978 | Waite et al. | 166/270.1 |
| 4,113,013 A | * | 9/1978 | Ledoux et al. | 166/275 |
| 4,510,997 A | * | 4/1985 | Fitch et al. | 166/263 |
| 5,725,054 A | | 3/1998 | Shayegi et al. | |
| 5,826,656 A | * | 10/1998 | McGuire et al. | 166/305.1 |
| 5,968,354 A | | 10/1999 | Brinkley | |
| 6,305,472 B2 | | 10/2001 | Richardson et al. | |
| 2008/0236845 A1 | * | 10/2008 | Morrow et al. | 166/400 |

OTHER PUBLICATIONS

Webb, K.J. et al., "Low Salinity Oil Recovery—Log-Inject-Log," SPE 89379, 2004, SPE/DOE Fourteenth Symposium on Improved Oil Recovery, Tulsa, Oklahoma, U.S.A., Apr. 17-21, 2004.

Tang, G.Q., "Salinity, Temperature, Oil Composition, and Oil Recovery by Waterflooding," SPE Reservoir Engineering, 12(4), Nov. 1997, pp. 269-276.

Tang, Guo-Qing, "Influence of Brine Composition and Fines Migration on Crude Oil/Brine/Rock Interactions and Oil Recovery," Journal of Petroleum Science and Engineering, 24, 99-111, 1999.

Webb, K.J., "Low Salinity Oil Recovery: The Role of Reservoir Condition Corefloods," 13th European Symposium on Improved Oil Recovery, Budapest, Hungary, Apr. 2005, pp. 1-7.

* cited by examiner

OIL RECOVERY BY SEQUENTIAL WATERFLOODING WITH OIL REINJECTION AND OIL RELOCATION

RELATED CASES

This application is the U.S. National Stage Patent Application of International Application No. PCT/US2009/39825, filed on Apr. 7, 2009, which claims the benefit of U.S. Provisional Patent Application Ser. No. 61/043,068 for "Oil Recovery By Sequential Waterflooding And Oil Reinjection" by Norman R. Morrow et al., filed on Apr. 7, 2008, which applications are hereby incorporated by reference herein for all that they disclose and teach.

FIELD OF THE INVENTION

The present invention relates generally to enhancing oil recovery from underground reservoirs and, more particularly, to enhanced oil recovery after waterflooding by partially recharging reservoir pore space with oil followed by re-waterflooding.

BACKGROUND OF THE INVENTION

About one-half of oil recovery worldwide is produced by waterflooding. Significant quantities of oil, typically, more than one-half of the original oil in place, remain in the reservoir after waterflooding and are commonly the target for improved oil recovery processes. When crude oil is displaced from rock by water, as is common practice in the process of oil recovery by water flooding, laboratory tests show that changes in the crude oil/brine/rock properties occur. For example, laboratory coreflood studies have shown increased oil recovery is achieved by waterflooding using low salinity water, compared with injection of seawater or high-salinity produced water (See, e.g., "Salinity, Temperature, Oil Composition And Oil Recovery By Waterflooding" by G. Q. Tang and N. R. Morrow, SPE Reservoir Engineering 12(4), 269-276 (November 1997); "Influence Of Brine Composition And Fines Migration On Crude Oil/Brine/Rock Interactions And Oil Recovery" by G. Q. Tang and N. R. Morrow, J. Pet. Sci. Eng. 24, 99-111 (1999); and "The Role Of Reservoir Condition Corefloods" by K. J. Webb et al., $13^{th}$ European Symposium On Improved Oil Recovery, Budapest, Hungary (April 2005)). The improved oil recovery results from complex crude oil/brine/rock interactions. Laboratory corefloods suggest that as much as 50% additional oil could be produced if low-salinity water (<4000 ppm) is injected into the reservoir, as opposed to seawater or higher-salinity production water. These results have been shown to be applicable to the near well bore environment of an oil field in "Low Salinity Oil Recovery-Log-Inject-Log" by K. J. Webb et al. SPE 89379, 2004 SPE/DOE Fourteenth Symposium on Improved Oil Recovery, Tulsa, Okla., U.S.A. 17-21 (April 2004). A producing well (that is, a well that produces oil) was selected for the test to ensure that all saturation changes occurred under controlled test conditions and that the results would not be affected by previous high rate water injection. 10-15 'pore volumes' of high-salinity brine were injected into the 'volume of interest' to obtain a baseline residual oil saturation. This was followed by sequences of more dilute brine followed by high-salinity brine for calibration purposes. At least three further passes were run to ensure that a stable saturation value had been established after injection of each brine. Extensive water sampling was conducted to confirm brine salinities and increase confidence in the quantitative saturation results. The results were consistent with previous laboratory tests from other fields, and showed 25-50% reduction in residual oil saturation when waterflooding was undertaken using low-salinity brine.

The injection of discrete volumes of fluid in a reservoir recovery process application is known. For example, in the Water Alternating Gas (WAG) process, one tenth of the reservoir hydrocarbon volume might be injected over a period of one year with change from carbon dioxide injection for one month to water injection for one month, and so forth.

Significant quantities of oil still remain in the reservoirs after primary and secondary recovery.

SUMMARY OF THE INVENTION

Accordingly, it is an object of the present invention to provide a method for improving oil recovery from reservoirs.

Another object of the invention is to reduce residual oil quantities trapped in oil reservoirs such that overall oil recovery is improved.

Additional non-limiting objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the method for improving oil recovery from a reservoir which has been waterflooded, hereof, includes the steps of: recharging at least a portion of the reservoir with oil; and waterflooding the recharged portion of the reservoir, forming thereby a growing oil bank that advances ahead of the waterflooding.

Benefits and advantages of the present invention include, but are not limited to, increasing oil recovery from reservoirs at all stages of development up to and including mature reservoirs that produce at high water-to-oil ratios.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Briefly, the present invention includes a method for improving oil recovery from reservoirs. "Reservoir," as the term is used herein, refers to reservoirs at various stages of development from early production to mature reservoirs that have been waterflooded close to or at their economic limit, and are producing at high water-to-oil ratios. The term reservoir may include reservoirs that are used for underground oil storage, including the storage of strategic oil reserves. As stated hereinabove, when crude oil is displaced from a rock formation by water, as is common practice in the process of oil recovery by waterflooding, laboratory tests show that changes in the crude oil/water/rock properties occur. Laboratory tests by the present inventors show further that if a core is recharged with oil, rather than reproducing the original production curve of oil recovery versus pore volumes of water injected, the oil recovery achieved by waterflooding increases significantly. Furthermore, if cycles of oil and water injection are performed, there is a sequential increase in oil recovery. These results have been observed in tests with reservoir cores, outcrop sandstone, and outcrop carbonate for a range of initial water saturations ("Oil Recovery by Cyclic Waterflooding of Mixed-Wet Sandstone and Limestone" by N. Loahardjo et al., the 10th International Symposium on Reservoir Wettability, Abu Dhabi, UAE (October 2008)). Recoveries achieved by waterflooding for these materials for up to four cycles of flooding are illustrated in the EXAMPLES hereinbelow.

As used herein, the term "water" includes water containing salts and which is commonly referred to as brine, but without limitation on its salt concentration (and including pure water). Thus, improved oil recovery from oil reservoirs may also be achieved if the injection of water is followed by sequential injection of oil and water. This improvement in oil recovery is observed without changing the composition of the injected water, although variation in injected water composition may also yield improved oil recovery.

As used herein, the term "oil" includes produced oil, produced oil having modified composition, or produced or modified produced oil with the addition of additives that promote oil recovery by improved microscopic displacement and vertical and areal sweep efficiency. The source of the injected oil is not restricted to produced oil from the target reservoir. The term oil may also include oil contained within the target reservoir that through choice of injection schemes causes this reservoir oil to recharge zones, that is, refill the pore spaces that have been swept by waterflooding. For example, for wells that produce essentially water-free oil, conversion of a well from oil production to water injection can result in displacement of a growing oil bank which advances through the previously water-swept zone in front of a waterflood having the opposite direction. Of course, oil may be produced from the reservoir when the oil bank reaches a production well.

Addition of additives to the re-injected oil, such as solvents, scale inhibitors, and surface active agents for lowering interfacial tension and changing wettability, as examples, that are designed to improve well bore performance such as injectivity or productivity, as examples, is also contemplated. Addition of additives to the injected water slugs to give improved microscopic displacement of oil and improved vertical and areal sweep efficiency, and improved injectivity and/or productivity is also contemplated. For example, additives may include, but are not limited to, surfactants that promote recovery, and polymers for improved sweep efficiency.

The size of the injected water and oil slugs (volumes) depends on the properties of the reservoir and the properties of the injected oil. Typically, the size of an injected oil slug would be much smaller than the volume of the reservoir. For example, slugs of oil having sufficient volume to form propagating oil banks might be injected alternately with water over a period of months to several years.

Many variations on how oil may be reinjected are possible. However, the basic process hereof includes sequential recharging or partial recharging with oil in regions of a reservoir (at least a portion of the reservoir) that have been previously waterflooded, thereby increasing the oil saturation, and where a growing oil bank is obtained by subsequently waterflooding the region. The number of cycles may be determined to be sufficient where the cost of additional cycles outweighs the value of the additional oil recovered. For wells that are producing below capacity, there may be a distinct economic advantage to re-injection of produced oil derived from excess production capacity to give higher ultimate recovery through sequential waterflooding.

As stated hereinabove, recharging may also be achieved by displacement or relocation of oil within the reservoir so that zones which have been swept by waterflooding are recharged. Sequential waterflooding may be achieved, for example, by reversal of the direction of waterflooding by changing water injection wells into production wells and oil production wells into water injection wells. Reversal of flow may be repeated depending principally on economic and logistical considerations; that is, whereby an oil bank is propagated through the waterflooded regions, and builds as a result of the oil remaining behind the bank being reduced in volume with respect to the oil ahead of the bank.

Changing wells from injectors to producers and back to oil injectors, so that the direction of flow is reversed, may also be used for recharging or partially recharging swept oil zones to provide higher overall reservoir recovery. Swept zones may be recharged with oil by gravity drainage to give improved waterflood recovery. The recharge of the waterflooded volumes is achieved without reinjection of produced oil, although produced oil may still be advantageously injected.

Having generally described the present method, laboratory generated details thereof are presented in the following EXAMPLES.

In the EXAMPLES, the materials were prepared as follows:

A. Crude Oil:

The crude oil from a U.S. field was filtered to remove particulate matter and then vacuumed for 2 h at room temperature. Crude oil properties are set forth in TABLE 1.

TABLE 1

| | |
|---|---|
| $C_6$ asphaltenes, % weight | 6.3 |
| Acid #, mg KOH/g oil | 1.46 |
| Base #, mg KOH/g oil | 2.49 |
| API gravity | 23.57 |
| μ oil at 22° C., cP | 111.2 |
| μ oil at 60° C., cP | 20.1 |

B. Brines:

Synthetic seawater was prepared having the composition set forth in TABLE 2 hereof, and is hereinafter referred to as seawater or water. The water was degassed by vacuum for 2 h, and had a viscosity of about 0.6 cP at 60° C. In TABLE 2, $NaN_3$ is a biocide effective for inhibiting growth of bacteria, and TDS/L is the total dissolved solids per liter.

TABLE 2

| Composition [g/L] | Seawater |
|---|---|
| NaCl | 28 |
| KCl | 0.935 |
| $CaCl_2$ | 1.19 |
| $MgCl_2$ | 5.368 |

TABLE 2-continued

| Composition [g/L] | Seawater |
|---|---|
| $NaN_3$ | 0.1 |
| TDS/L | 35.493 |

C. Cores:

The origin of the cores, along with their lithologies, porosities (pore volumes) and permeabilities are set forth in TABLE 3. All cores were cylindrical with 1.5 in. in outer diameter and 3 in. in length. The permeabilities were measured using nitrogen gas. Outcrop cores were cut and dried in an oven at 105° C.

TABLE 3

| Name | Lithology | Origin | Porosity, % | Permebility, mili-Darcy |
|---|---|---|---|---|
| EdGc 1 | Carbonate | Outcrop | 22 | 26 |
| EdGc 3 | Carbonate | Outcrop | 22 | 23 |
| EdGc 4 | Carbonate | Outcrop | 20 | 27 |
| LK 2 | Sandstone | Reservoir | 20 | 886 |
| BS 4 | Sandstone | Outcrop | 20 | 615 |
| BS 5 | Sandstone | Outcrop | 20 | 622 |
| BS 6 | Sandstone | Outcrop | 21 | 643 |
| BS 7 | Sandstone | Outcrop | 21 | 777 |

Figure 1:
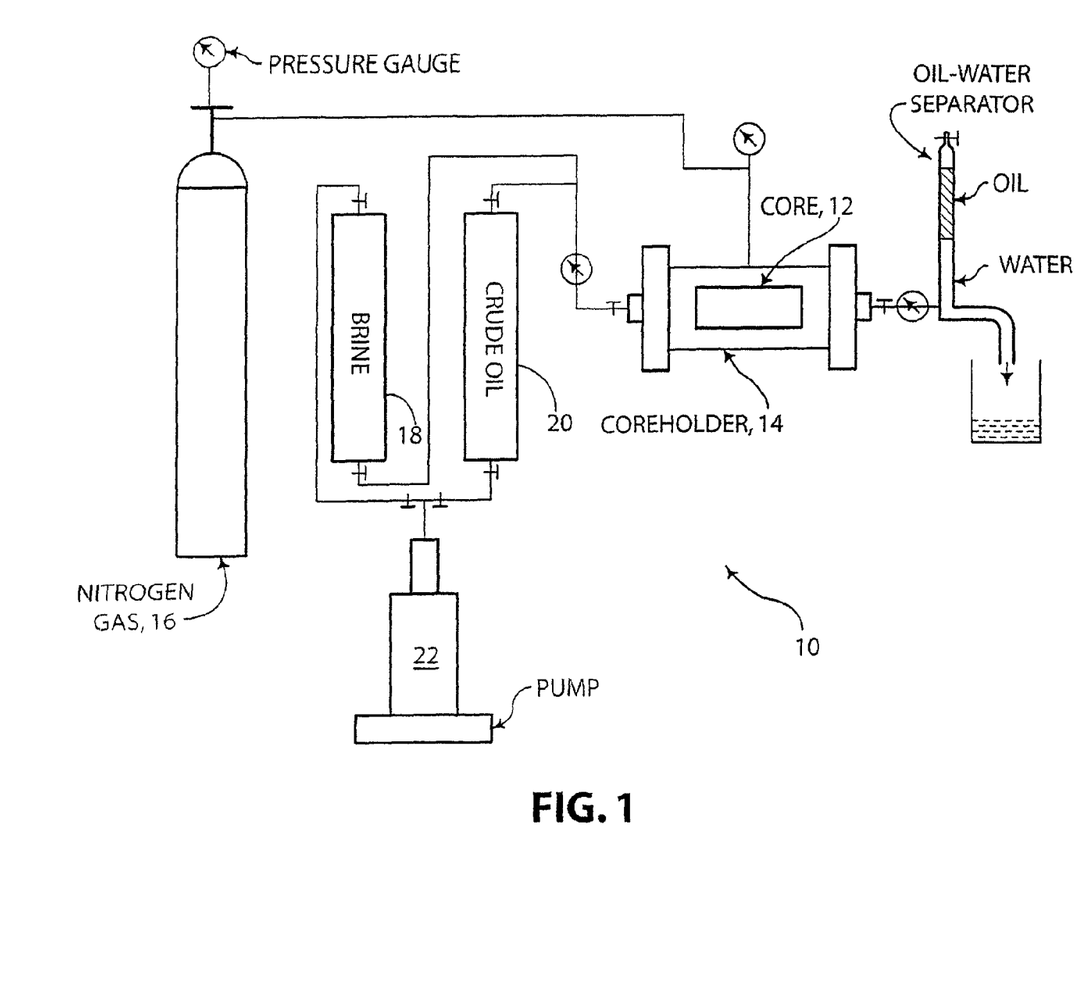
FIG. 1 is a schematic representation of the apparatus used for core cleaning, establishing initial water saturation in a core, and for oil and water flooding of a core for demonstrating the method of the present invention.

Turning now to FIG. 1, shown is a schematic representation of an apparatus, 10, used to demonstrate the method of the present invention on a laboratory scale. The apparatus was used for testing cores cut from various rocks, and for establishing initial water saturation thereof, charging with oil, and coreflooding, and is described in more detail in "Brine Composition And Waterflooding Recovery For Selected Crude Oil/Brine/Rock Systems," by G. Q. Tang, Ph.D. Thesis, University of Wyoming, May 1998.

Reservoir or outcrop core, 12, was placed in core holder, 14, and pressurized to about 300 psi confining pressure in apparatus 10. The core was first flushed at 2 cc/min. with 10 pore volumes (PV) of toluene to remove organic materials, flushed with 10 PV of methanol to remove salts, and flushed again with toluene to remove any newly exposed organic materials. If the effluent was not clear, the core was flooded with methanol followed again with toluene. The cleaned core was dried by evaporation at room temperature. Outcrop cores were cut from quarried blocks and then oven dried. After drying, the permeability to nitrogen of each core was measured.

Each core was completely saturated with water, 18, as set forth in TABLE 2, hereinabove, and remained submerged in the same water for 14 days at room temperature to establish ionic equilibrium. The core was then flooded with 80 cc of the crude oil, 20, from one direction, and with 20 cc of the crude oil from the reverse direction using pump, 22, in order to establish initial water saturation. After establishing initial water saturation by displacement with crude oil, the core was removed from the core holder and submerged in the crude oil to age at 75° C. for 14 days in a sealed vessel.

A cycle, C, as described in the numbered curves of the EXAMPLES hereinbelow, and in the abscissa of the graphs in FIGS. 10 and 11, hereinbelow, is defined as flooding with water followed by re-establishment of initial water saturation by flooding with crude oil, while $S_{wi}$ is the initial water saturation at room temperature established by displacement with crude oil. Tests on each core are identified according to the sequence of flood cycles.

After aging, a core was placed in core holder 14 and waterflooded at 1 ft/d. All the waterfloods were performed at either 60° C. or room temperature as indicated. The temperature of $T_d=60°$ C. was selected since reservoirs are often found at about this temperature. In practice, the injection water is raised to the reservoir temperature principally by contact with the reservoir. During waterflooding, the effluent oil and water volumes, and the pressure drop across the core were recorded.

Example 1

Figure 2:
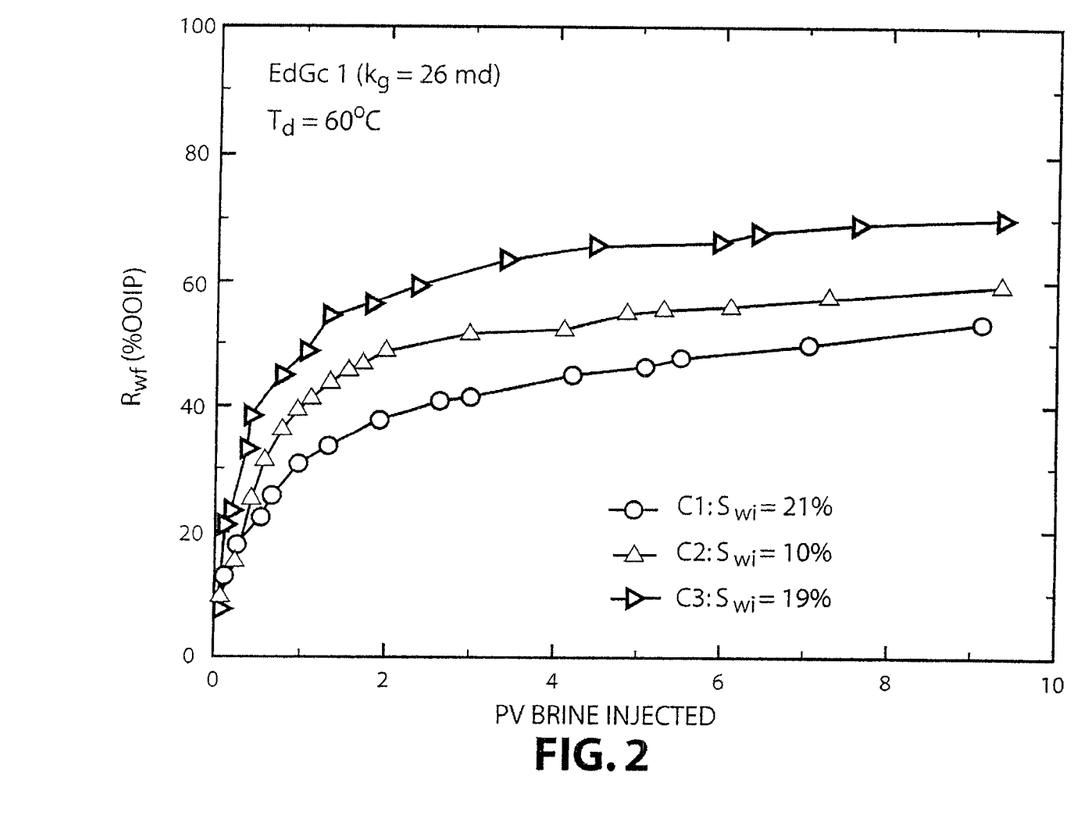
FIG. 2 is a graph of the percentage recovered of the original oil in place, $R_{wf}$(% OOIP), as a function of the injected water in units of pore volume at $T_d=60°$ C. for a first carbonate core, where $S_{wi}$ is the initial water saturation at room temperature established by displacement with crude oil, and a cycle, as described in the numbered curves is defined as the flooding with water followed by re-establishment of initial water saturation by flooding with crude oil.

FIG. 2 is a graph of the percentage recovered of the original oil in place (OOIP), $R_{wf}$ (% OOIP), as a function of the injected water in units of pore volume, PV, for a first carbonate core (EdGc 1) at $T_d=60°$ C., where $S_{wi}$ is the initial water saturation at room temperature established by displacement with crude oil. In FIG. 2, curve C1, the initial water saturation was established at room temperature, the core then being aged and waterflooded with seawater; curve C2 was taken after curve C1, the initial water saturation being re-established by flooding with crude oil at room temperature, and the core subsequently being waterflooded with seawater; and in curve C3, the same procedure as for curve C2 was repeated.

Example 2

Figure 3:
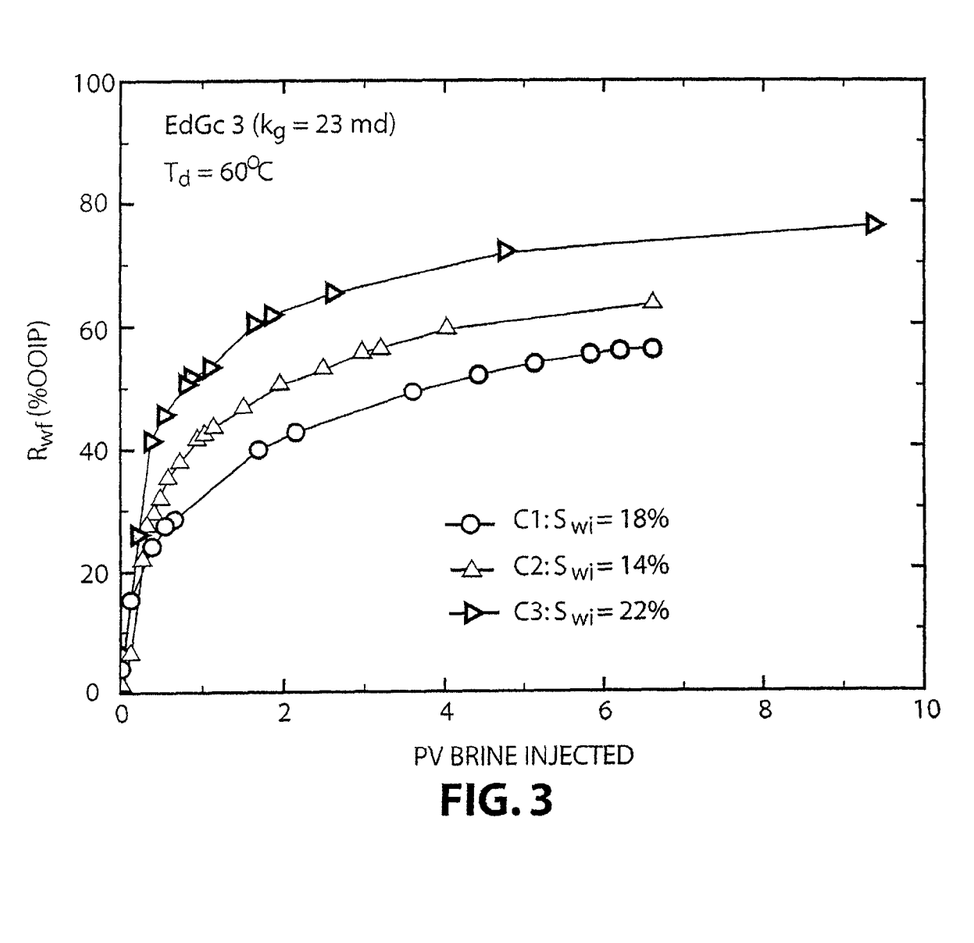
FIG. 3 is a graph of the percentage recovered of the original oil in place, $R_{wf}$(% OOIP), as a function of the injected water in units of pore volume at $T_d=60°$ C. for a second carbonate core, where $S_{wi}$ is the initial water saturation at room temperature established by displacement with crude oil, and a cycle, as described in the numbered curves, is defined as the flooding with water followed by re-establishment of initial water saturation by flooding with crude oil.

FIG. 3 is a graph of the percentage recovered of the original oil in place, $R_{wf}$(% OOIP), as a function of the injected water in units of pore volume for a second carbonate core (EdGc 3) at $T_d=60°$ C., where $S_{wi}$ is the initial water saturation at room temperature established by displacement with crude oil. In FIG. 3, curve C1, the initial water saturation was established at room temperature, the core then being aged and waterflooded with seawater; curve C2 was taken after curve C1, the initial water saturation being re-established by flooding with crude oil at room temperature, and the core subsequently waterflooded with seawater; in curve C3, the same procedure as for curve C2 was repeated.

Example 3

Figure 4:
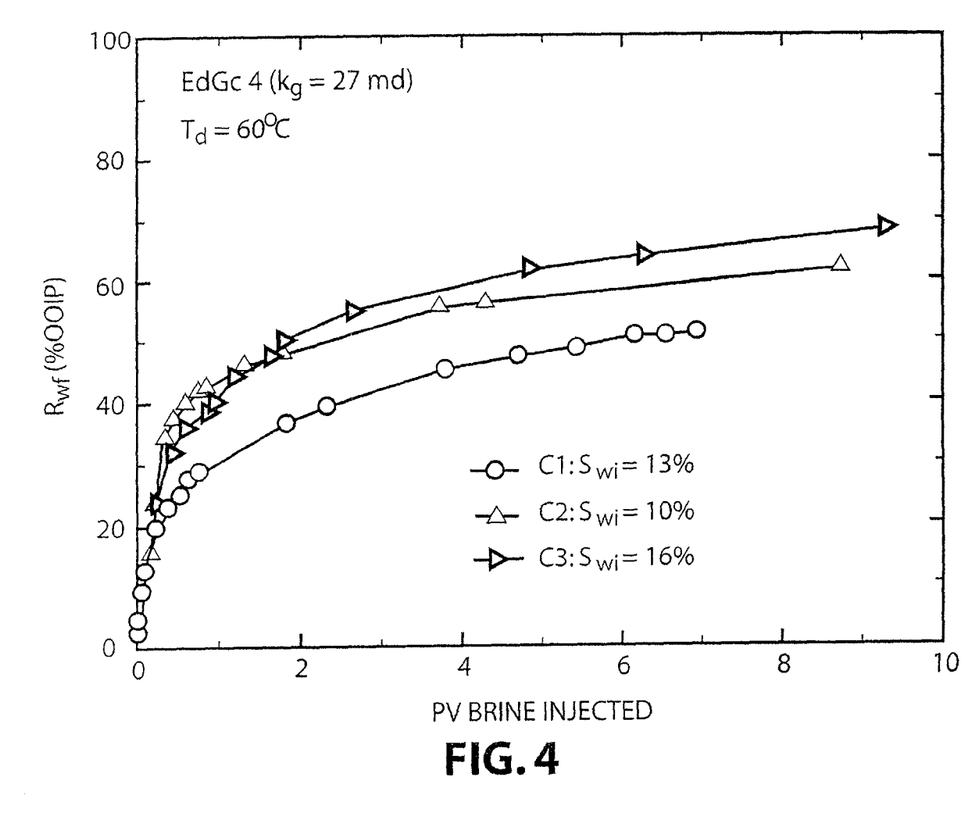
FIG. 4 is a graph of the percentage recovered of the original oil in place, $R_{wf}$ (% OOIP), as a function of the injected water in units of pore volume at $T_d=60°$ C. for a third carbonate core, where $S_{wi}$ is the initial water saturation at room temperature established by displacement with crude oil, and a cycle, as described in the numbered curves, is defined as the flooding with water followed by re-establishment of initial water saturation by flooding with crude oil.

FIG. 4 is a graph of the percentage recovered of the original oil in place, $R_{wf}$(% OOIP), as a function of the injected water in units of pore volume for a third carbonate core (EdGc 4) at $T_d=60°$ C., where $S_{wi}$ is the initial water saturation at room temperature established by displacement with crude oil. In FIG. 4, curve C1, the initial water saturation was established at room temperature, the core then being aged and waterflooded with seawater; curve C2 was taken after curve C1, the initial water saturation being re-established by flooding with crude oil at room temperature, and the core subsequently waterflooded with seawater; in curve C3, the same procedure as for curve C2 was repeated.

Example 4

Figure 5:
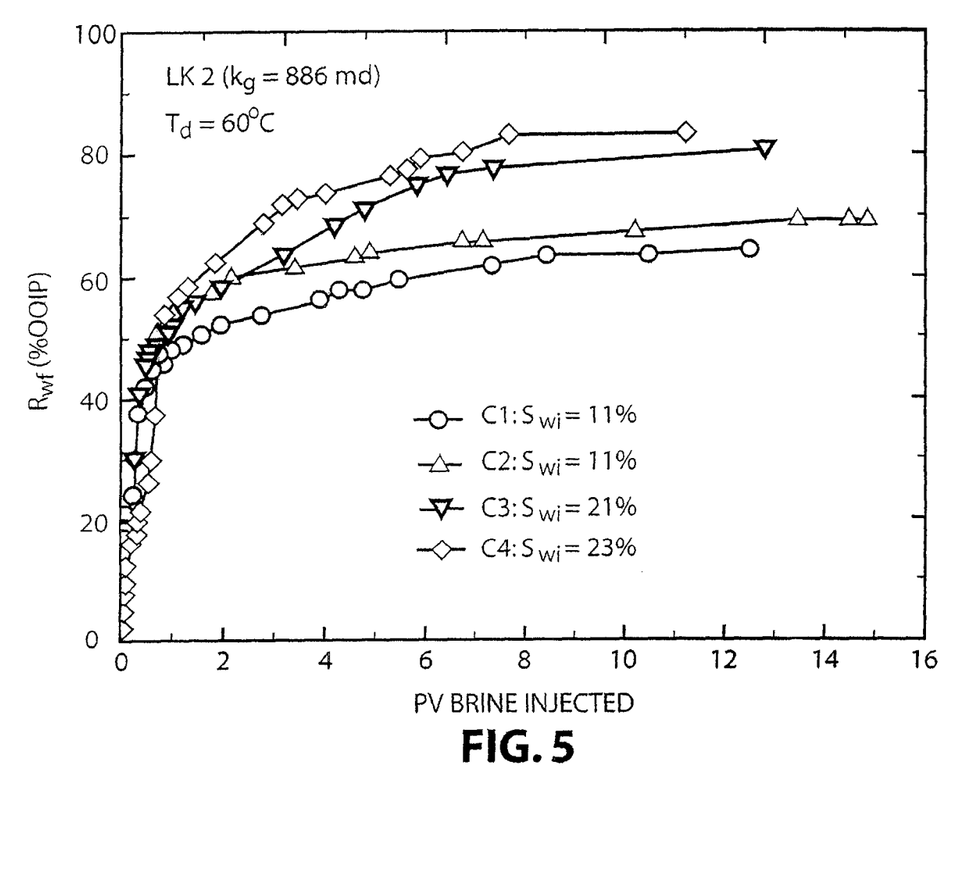
FIG. 5 is a graph of the percentage recovered of the original oil in place, $R_{wf}$ (% OOIP), as a function of the injected water in units of pore volume at $T_d=60°$ C. for a reservoir sandstone core, where $S_{wi}$ is the initial water saturation at room temperature established by displacement with crude oil, and a cycle, as described in the numbered curves, is defined as the flooding with water followed by re-establishment of initial water saturation by flooding with crude oil.

FIG. 5 is a graph of the percentage recovered of the original oil in place, $R_{wf}$(% OOIP), as a function of the injected water in units of pore volume for a reservoir sandstone core (LK 2) at $T_d=60°$ C., where $S_{wi}$ is the initial water saturation at room temperature established by displacement with crude oil. In FIG. 5, curve C1, the initial water saturation was established at room temperature after the core was cleaned, the core then being aged and waterflooded with seawater; curve C2 was taken after curve C1, the initial water saturation being re-established at room temperature by flooding with crude oil at room temperature, and the core subsequently waterflooded with seawater; in curves C3 and C4, the same procedure as for curve C2 was repeated.

Example 5

Figure 6:
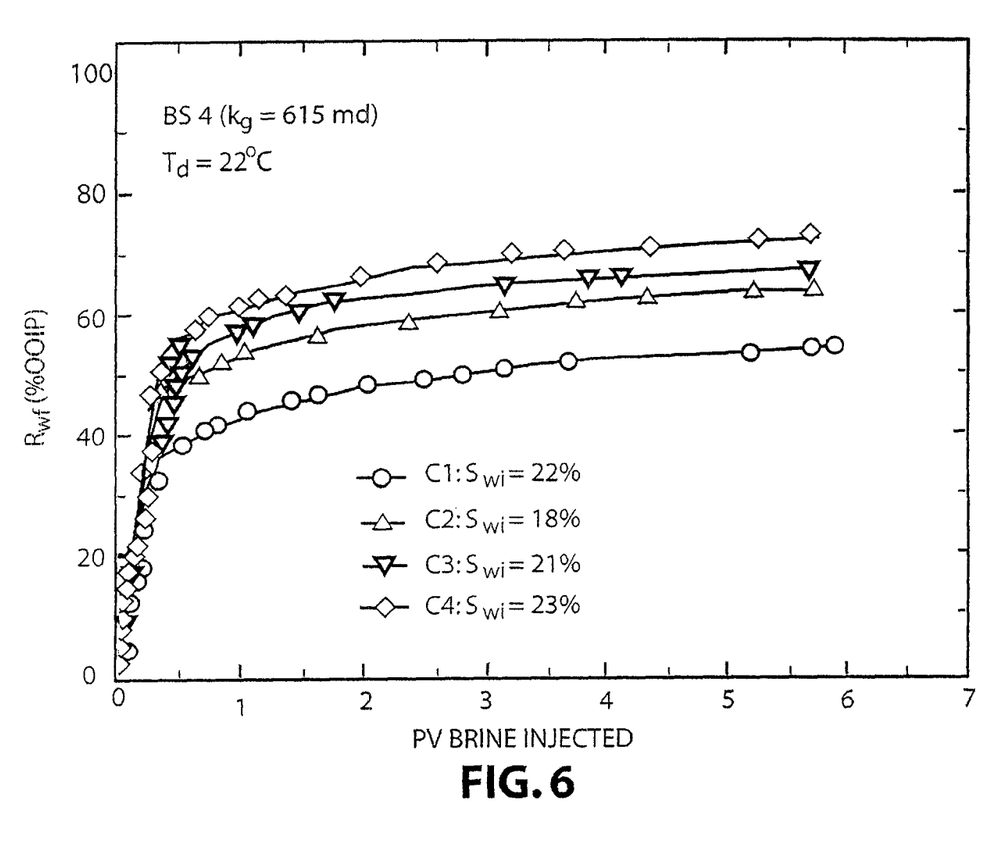
FIG. 6 is a graph of the percentage recovered of the original oil in place, $R_{wf}$ (% OOIP), as a function of the injected water in units of pore volume at $T_d=22°$ C. for a second sandstone core, where $S_{wi}$ is the initial water saturation at room temperature established by displacement with crude oil, and a cycle, as described in the numbered curves, is defined as the flooding with water followed by re-establishment of initial water saturation by flooding with crude oil.

FIG. 6 is a graph of the percentage recovered of the original oil in place, $R_{wf}$(% OOIP), as a function of the injected water in units of pore volume for a second sandstone core (BS 4) at $T_d=22°$ C., where $S_{wi}$ is the initial water saturation at room temperature established by displacement with crude oil. In FIG. 6, curve C1, the initial water saturation was established at room temperature. The core was then aged with crude oil at elevated temperature. Next, the core was waterflooded with seawater at room temperature to obtain curve C1. The initial water saturation was re-established at room temperature, and the core was subsequently waterflooded with seawater at room temperature to obtain curve C2. Curves C3 and C4, were obtained by repeating the procedure used to obtain curve C2.

Example 6

Figure 7:
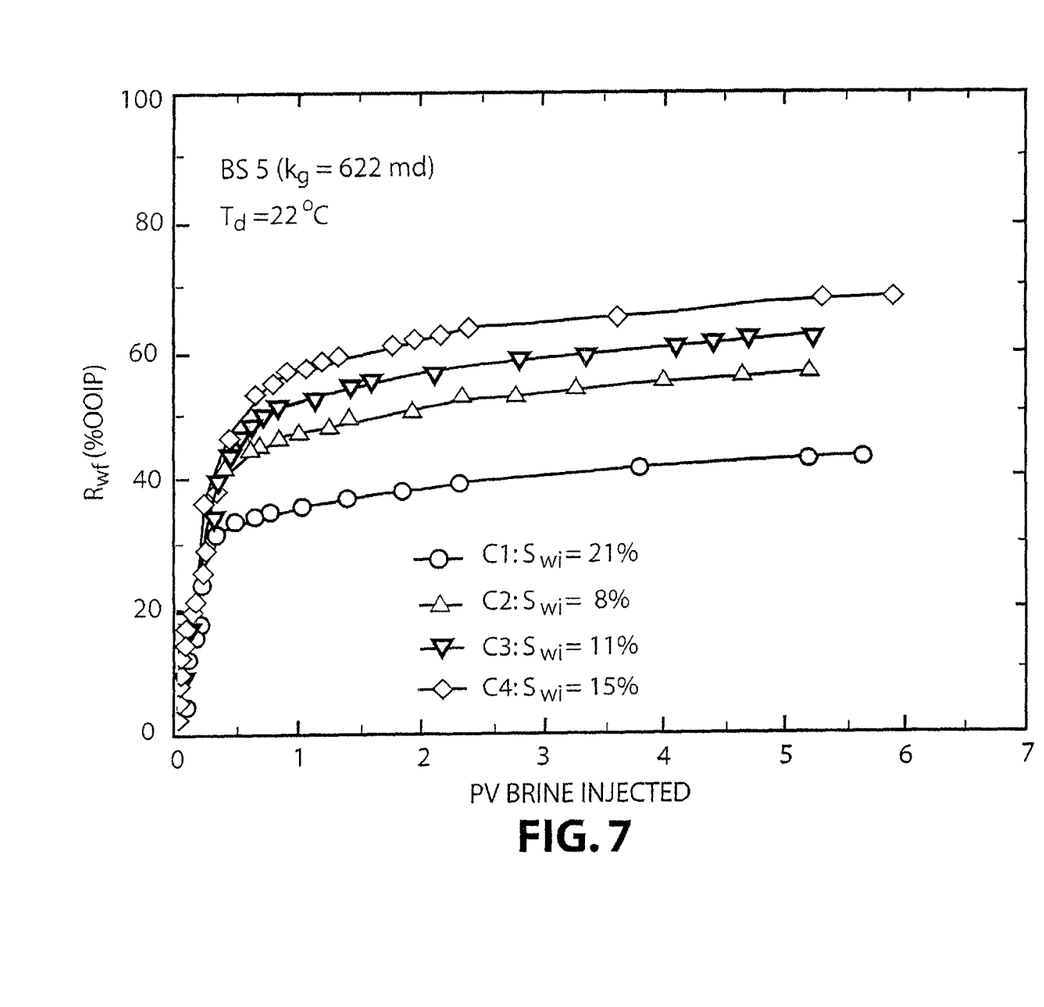
FIG. 7 is a graph of the percentage recovered of the original oil in place, $R_{wf}$ (% OOIP), as a function of the injected water in units of pore volume at $T_d=22°$ C. for a third sandstone core, where $S_{wi}$ is the initial water saturation at room temperature established by displacement with crude oil, and a cycle, as described in the numbered curves, is defined as the flooding with water followed by re-establishment of initial water saturation by flooding with crude oil.

FIG. 7 is a graph of the percentage recovered of the original oil in place, $R_{wf}$(% OOIP), as a function of the injected water in units of pore volume for a third sandstone core (BS 5) at $T_d=22°$ C., where $S_{wi}$ is the initial water saturation at room temperature established by displacement with crude oil. For curve C1 in FIG. 7, the initial water saturation was established at room temperature. The core was then aged with crude oil at elevated temperature. Next, the core was waterflooded with seawater at room temperature to obtain curve C1. The initial water saturation was re-established at room temperature, and the core was subsequently waterflooded with seawater at room temperature to obtain curve C2. Curves C3 and C4, were obtained by repeating the procedure used to obtain curve C2.

Example 7

Figure 8:
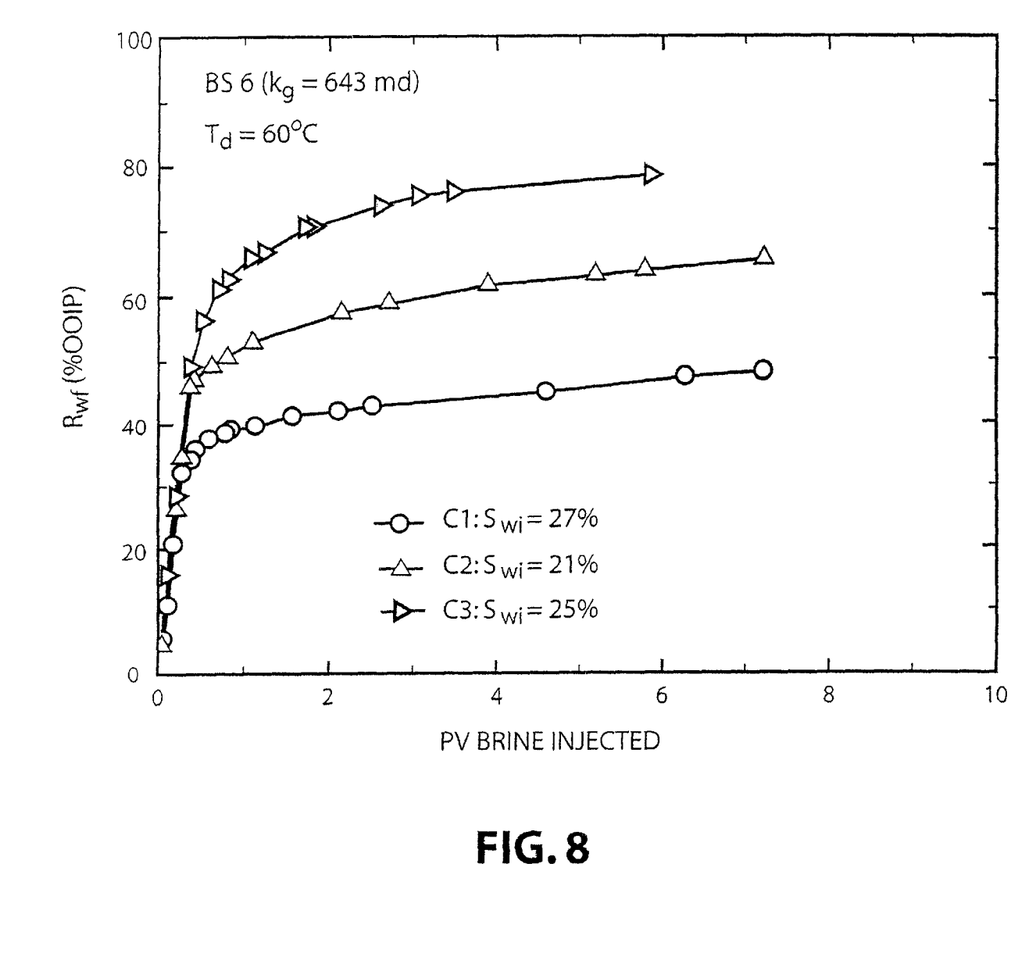
FIG. 8 is a graph of the percentage recovered of the original oil in place, $R_{wf}$ (% OOIP), as a function of the injected water in units of pore volume at $T_d=60°$ C. for a fourth sandstone core, where $S_{wi}$ is the initial water saturation at room temperature established by displacement with crude oil, and a cycle, as described in the numbered curves, is defined as the flooding with water followed by re-establishment of initial water saturation by flooding with crude oil.

FIG. 8 is a graph of the percentage recovered of the original oil in place, $R_{wf}$(% OOIP), as a function of the injected water in units of pore volume for a fourth sandstone core (BS 6) at $T_d=60°$ C., where $S_{wi}$ is the initial water saturation at room temperature established by displacement with crude oil. In FIG. 8, to obtain curve C1, the core was saturated with seawater at room temperature. The initial water saturation was established by flow of crude oil at room temperature. The core was then aged in crude oil and waterflooded with seawater at elevated temperature. Curve C2 was taken after curve C1, the initial water saturation being re-established at room temperature followed by waterflooding with seawater at elevated temperature. Curve C3, was obtained using the same procedure as for curve C2.

Example 8

Figure 9:
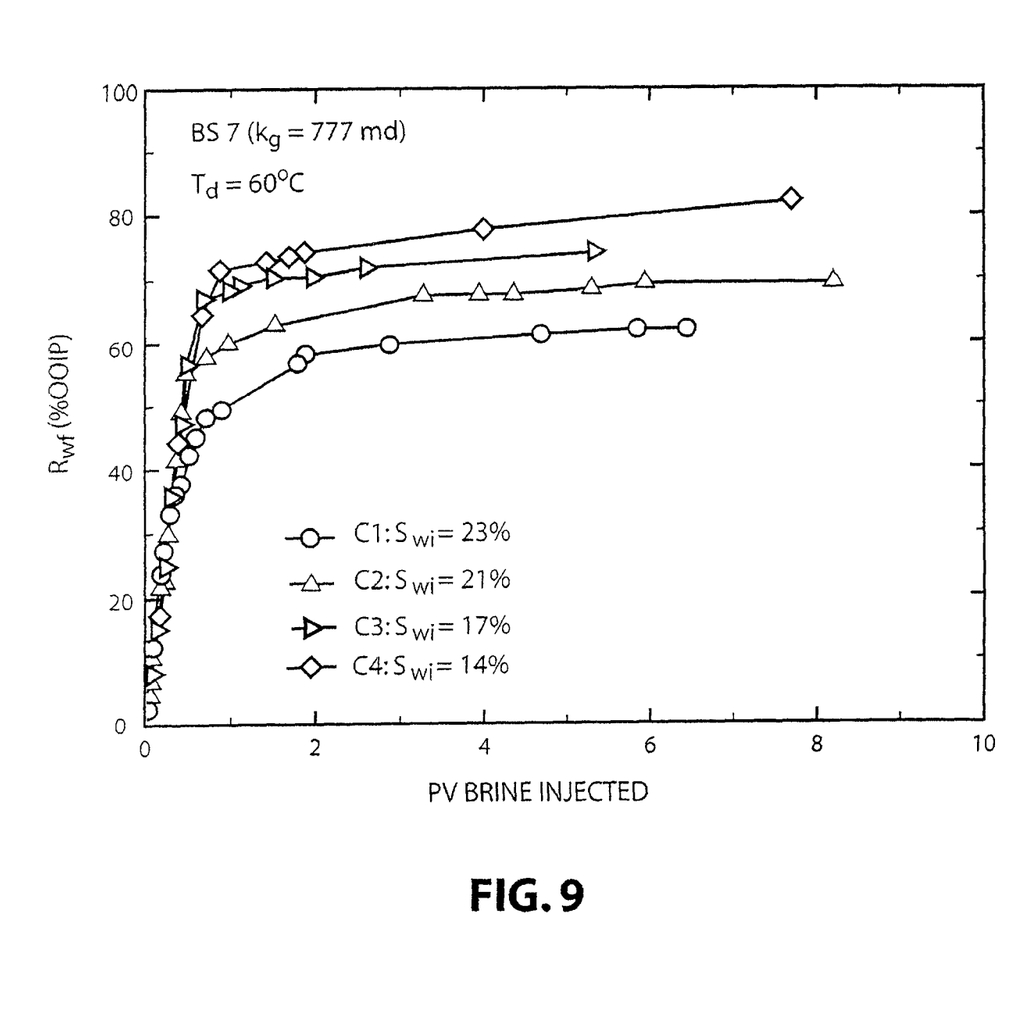
FIG. 9 is a graph of the percentage recovered of the original oil in place, $R_{wf}$ (% OOIP), as a function of the injected water in units of pore volume at $T_d=60°$ C. for a fifth sandstone core, where $S_{wi}$ is the initial water saturation at room temperature established by displacement with crude oil, and a cycle, as described in the numbered curves, is defined as the flooding with water followed by re-establishment of initial water saturation by flooding with crude oil.

FIG. 9 is a graph of the percentage recovered of the original oil in place, $R_{wf}$(% OOIP), as a function of the injected water in units of pore volume for a fourth sandstone core (BS 7) at $T_d=60°$ C., where $S_{wi}$ is the initial water saturation at room temperature established by displacement with crude oil. In FIG. 9, to obtain curve C1, the core was saturated with seawater at room temperature. The initial water saturation was established by flow of crude oil at room temperature. The core was then aged in crude oil and waterflooded with seawater at elevated temperature. Curve C2 was taken after curve C1, the initial water saturation being re-established at room temperature followed by waterflooding with seawater at elevated temperature. Curves C3 and C4 were obtained using the same procedure as for curve C2.

Example 9

Figure 10:
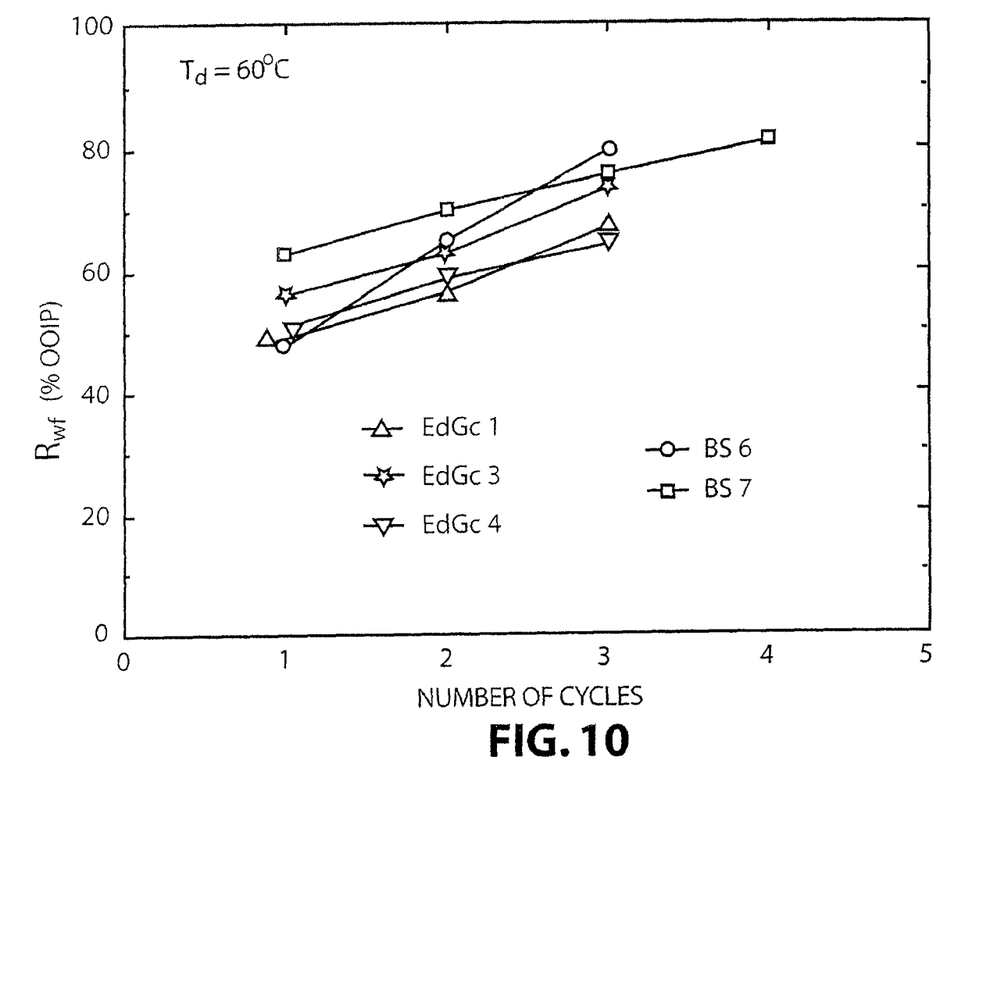
FIG. 10 is a graph of the percentage recovered of the original oil in place, $R_{wf}$ (% OOIP), as a function of the number of cycles at $T_d=60°$ C. for carbonate and sandstone cores, where a cycle is defined as the flooding with water followed by re-establishment of initial water saturation by flooding with crude oil.
Figure 11:
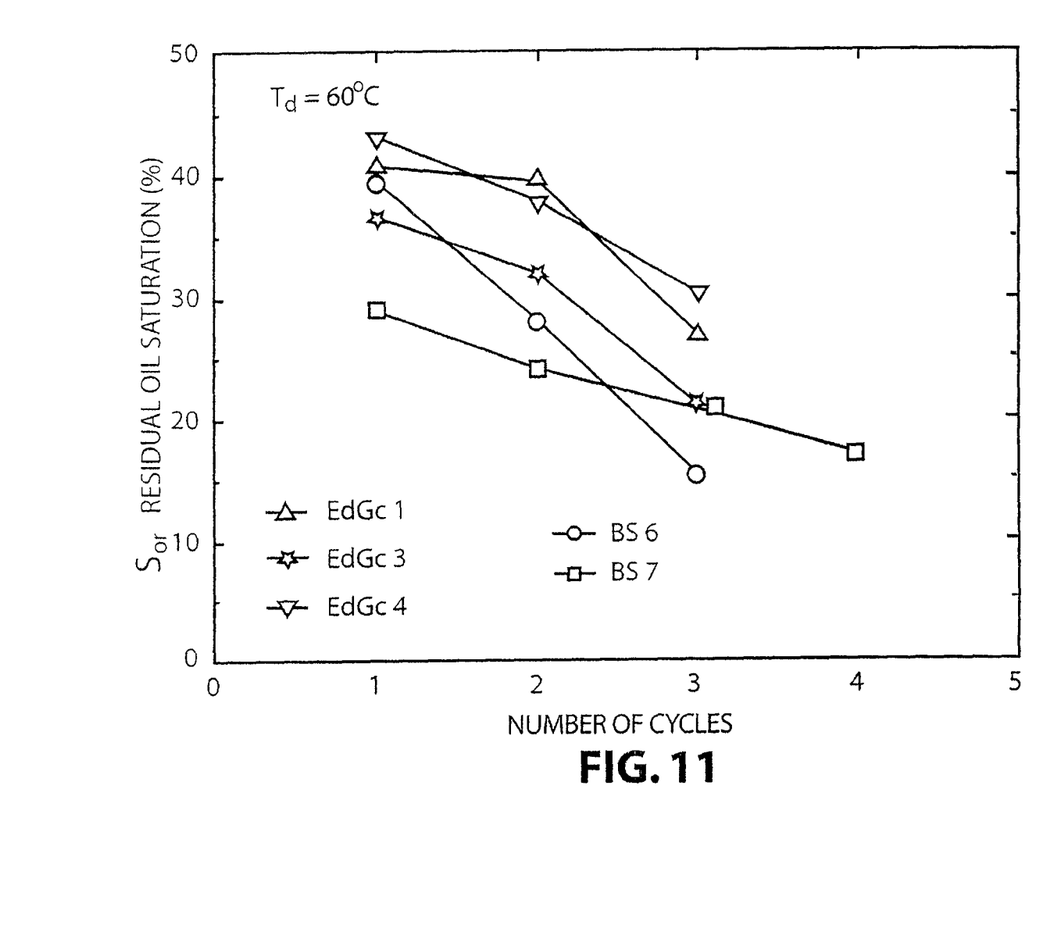
FIG. 11 is a graph of the residual oil saturation, $S_{or}$ (%), as a function of the number of cycles at $T_d=60°$ C. for carbonate and sandstone cores, where a cycle is defined as the flooding with water followed by re-establishment of initial water saturation by flooding with crude oil.

FIG. 10 is a graph of the percentage recovered of the original oil in place, $R_{wf}$ (% OOIP), as a function of the number of cycles at $T_d=60°$ C. for carbonate and sandstone cores, where a cycle is defined as the flooding with water followed by re-establishment of initial water saturation by flooding with crude oil. A consistent and substantial increase in recovery as a function of consecutive flooding cycles may be observed. FIG. 11 is a graph of the residual oil saturation, $S_{or}$ (%), as a function of the number of cycles at $T_d=60°$ C. for carbonate and sandstone cores, where a cycle is defined as the flooding with water followed by re-establishment of initial water saturation by flooding with crude oil. A comparable decrease in residual oil saturation for both sandstone and the carbonate cores as a function of consecutive flooding cycles may be observed.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for improving crude oil recovery from a previously waterflooded reservoir, comprising the steps of;
   recharging at least a portion of the reservoir with crude oil; and
   waterflooding the recharged portion of the reservoir, forming thereby a growing crude oil bank that advances ahead of the waterflooding.

2. The method of claim 1, further comprising the step of producing crude oil from the oil bank.

3. The method of claim 2, wherein the steps are repeated until cost of subsequent steps exceeds the value of the crude oil produced from said step of producing crude oil from the crude oil bank.

4. The method of claim 1, wherein the crude oil used in said step of recharging a portion of the reservoir with crude oil comprises crude oil obtained from the reservoir.

5. The method of claim 4, wherein the crude oil displaced by a previous waterflooding of at least a portion of the reservoir is used to recharge the portion of the reservoir prior to said step of waterflooding the recharged portion of the reservoir.

6. The method of claim 4, wherein the oil displaced by a previous waterflooding of at least a portion of the reservoir is used to recharge at least a second portion of the reservoir, forming thereby a recharged second portion of the reservoir, prior to said step of waterflooding the recharged second portion of the reservoir.

7. The method of claim 4, further comprising the step of waterflooding in the direction opposite to a prior step of waterflooding effective for displacing a second oil bank in the opposite direction to the oil bank displaced by said prior step of waterflooding.

8. The method of claim 1, wherein said step of waterflooding is performed using brine.

9. The method of claim 8, wherein said brine comprises seawater.

10. The method of claim 8, wherein the brine comprises additives.

11. The method of claim 10, wherein the additives are chosen from surfactants and polymers effective for improving waterflooding efficiency, and mixtures thereof.

12. The method of claim 1, wherein said step of recharging at least a portion of the reservoir with crude oil is performed using crude oil containing additives.

13. The method of claim 12, wherein the additives are chosen from solvents, scale inhibitors, and surface active agents, and mixtures thereof.

* * * * *